Jan. 11, 1949.         C. C. WATSON                    2,458,756
           MEANS FOR CONTROLLING AND EQUALIZING
                    TUBE TEMPERATURES
                   Filed Jan. 1, 1945
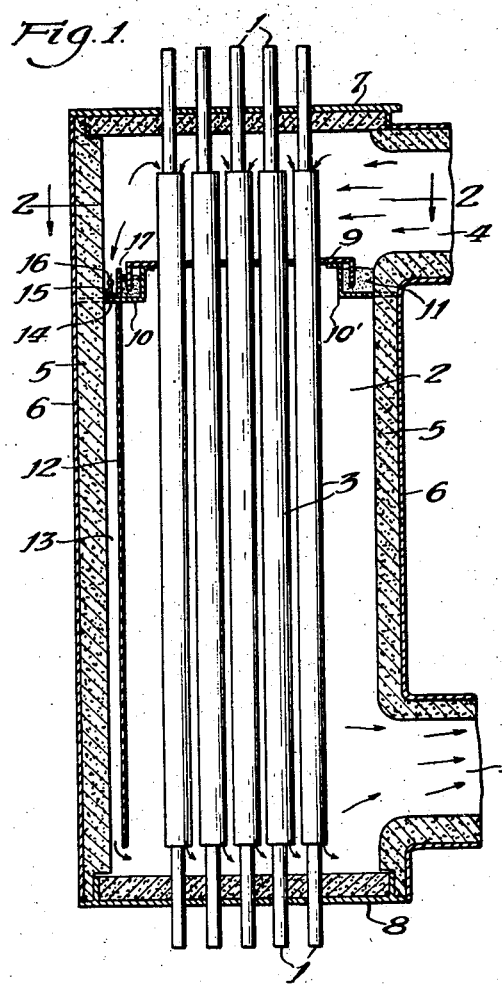
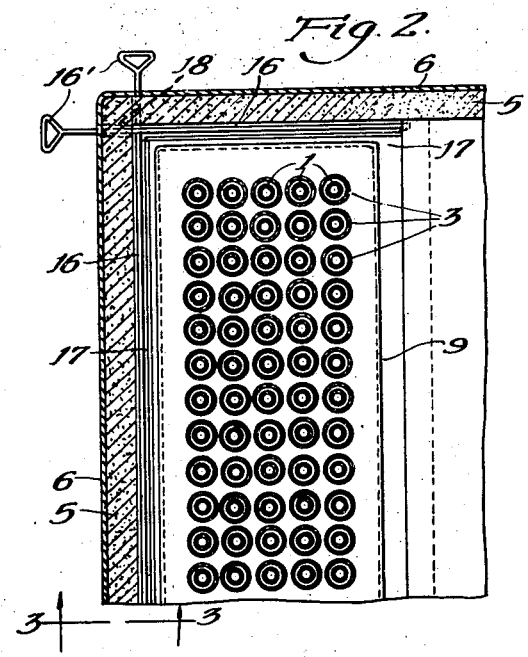
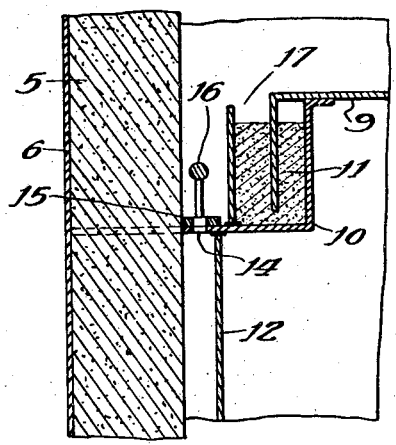
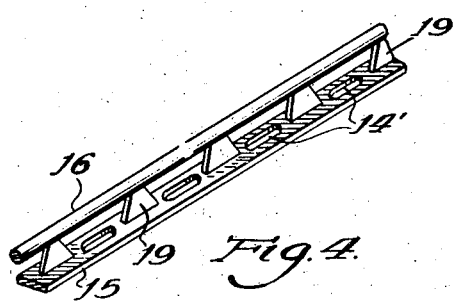
Inventor:
Charles C. Watson
By: Lee J. Gary
    Attorney Patented Jan. 11, 1949

2,458,756

UNITED STATES PATENT OFFICE 2,458,756

MEANS FOR CONTROLLING AND EQUALIZ-ING TUBE TEMPERATURES

Charles C. Watson, Evanston, Ill., assignor to Universal Oil Products Company, Chicago, Ill., a corporation of Delaware Application January 1, 1945, Serial No. 570,990

2 Claims. (Cl. 257—228)

This invention relates to a means of equalizing temperatures in the tubes of a tube bank within a heat exchange chamber, or more specifically a means for eliminating the temperature differential between the outer tubes and the inner tubes of a relatively compact bank of tubes; the temperature differential resulting from the cooling effect of the exterior walls of the enclosing chamber.

Within any cell or chamber having a group or bank of tubes there is always some inequality of heat supply to or from the outside tubes of the bank as compared to the inner tubes of the bank. Even though well insulated, the exterior walls will be cooler than the heating medium circulating through the chamber, due to conduction and radiation losses. Air infiltration also will account for lower temperatures along the outside walls of some types of chambers, such as those employing low pressures and bolted panel type of construction.

The object of this invention is to substantially eliminate the cooling effect of exterior chamber walls on a tube bank. This may be accomplished by placing a jacket or plates just inside and spaced slightly away from the chamber wall or walls in order to allow a regulated amount of heating medium to flow into the space therebetween. The regulation or control of the flow of heating medium to this space is made by a slidable slotted strip, which when moved longitudinally will open and close a series of orifice slots provided at the upstream end of the jacketed space.

This invention is very useful, for instance in connection with the reactor cell of a butane dehydrogenation unit where the endothermic heat for processing, required by the catalytic reactor tubes contained therein, is supplied by hot combustion or flue gases passed through the cell, while for the reactivating process, less-hot flue gases are supplied to carry away exothermic heat from the tubes in the cell. The construction of the cell and tube bank is such that the hot gases are channeled into individual sleeves placed around each tube in the group, and do not flow through the body of the chamber itself. The tubes and sleeves adjacent the outside walls of the chamber, therefore, will contribute the greater part of the heat loss to the walls, and thus be cooler than the interior tubes. This inequality of heating in the reactor tubes is very undesirable resulting in a non-uniform product obtained from the processing cycle.

The dehydrogenation reactor cell, in which the invention may be used to substantially eliminate unequal tube temperatures, is rectangular in shape and has the reactor tubes vertically positioned. The walls are of a hard-surfaced insulating block with a sheet metal casing on the outside. For this type of cell, vertical jacket plates may be suspended from an upper horizontal partition plate along each of the exterior walls of the cell, and will be spaced slightly away from the inside surface of the insulating block, say approximately one inch. Narrow slots may then be placed in the horizontal partition plate just above this space provided between the jacket and outer wall in order to admit the hot gases to this space. A movable bar with correspondingly spaced slots may be provided to slide on the partition plate above the fixed slots, such that adjustability can be given to the amount of heating medium flowing to the jacketed space. It is further contemplated that a rod, or some type of extension attached to the slide bar, will pass through the cell wall and provide means for opening and closing the gas inlet slots from the outside of the reactor chamber.

While the above discussion points out the particular adaptability of the invention to the butane dehydrogenation reactor chamber, it is not intended to limit the invention to this type of unit only, since other tubular-containing cells and chambers may well make use of the improvement to equalize tube temperatures.

Briefly the invention comprises placing inner plates or a jacket inside and spaced away from the exterior walls of a chamber containing a bank of tubular members therein, and providing means for admitting and regulating flow of a heating and/or cooling medium to the space provided, in order to maintain the temperature of all exterior tubes substantially equal to that of all the interior tubes of the bank.

The features and operation of the improvement comprising this invention will be more apparent with reference to the accompanying drawing.

Figure 1 shows in cross-sectional elevation a chamber containing a bank of tubes, and the added features for temperature equalizing comprising this invention.

Figure 2 shows a partial-sectional plan of the chamber and tubes as indicated by the line 2—2 of Figure 1.

Figure 3 shows an enlarged detail of a portion of the chamber indicated by line 3—3 in Figure 2.

Figure 4 is an enlarged perspective view of a portion of the slide bar member 15 of Figure 3.

Referring now to Figure 1, the numeral 1 is given to each of the tubular elements of a tube bank passing through a cell or chamber 2. Around each tubular element 1 is placed a sleeve 3, such that an annular space is provided for hot combustion gases to enter, as indicated by the arrows. The heating gases enter the top of the cell through an inlet duct 4. For the cell shown the walls are constructed of a thick block-type of insulation 5 and sheet metal casing plates 6. An upper tube sheet 7 and a lower tube sheet 8 may be castings and serve to support the tubes 1. A horizontal baffle sheet 9 is continuous through the entire cell 2 and serves to block the flow of hot gases through the cell and around the outside of the sleeves 3. The angle-shaped members 10 and 10' are continuous around the periphery of the cell 2 and serve to hold sand 11 or some similar packing material to provide a seal against gas flow at these points. A jacket sheet 12 which comprises one of the features of this invention is suspended from the sand-holding member 10 and should be continuous around the inside of all exterior walls. This jacket 12 is spaced somewhat away from the inner surface of the insulating wall 5 providing thereby a space 13 for flow of the heating gas. It should be noted that the jacket sheet 12 stops short of the bottom of the cell 2 in order to provide space and means for discharging the heating medium. The hot gases are removed from the cell 2 by means of outlet duct 4'. Another feature of this invention is the continuous series of slots 14 placed in the seal member 10 just above the space 13, in order to admit hot gases to this space 13. Above the slots 14 in the seal plate or plates 10 are placed slidable strips 15, one for each exterior wall. The strips 15 are perforated with slots 14' to match the slots 14 in the plates 10, such that these strips 15 may act as valves to regulate heat flow to the space 13. Rods 16 are attached to the slide strips 15 and should extend through the exterior walls to provide a means exterior from the chamber for pushing or pulling the valve strip 15. A retainer or separating strip 17 to hold the sand 11 is provided at the walls having the jacket 12 and the hot gas inlet in order to have space for the inlet slots 14 and the control valve strip 15.

Referring now to Figure 2, a partial plan view of the cell and tubes is shown at the plane cut by the line 2—2. Slide rods 16 which are attached to the slide strips 15 are shown on the side and end walls of the cell 2. Handles 16' may be placed on the ends of the rods 16 which project through the chamber walls 5, for convenience in grasping, for adjustment of hot gas flow to the space 13. It is, of course, possible to provide mechanical means, gearing and the like, if it is so desired, for controlling the movement of the rod 16 and strip 15. A sleeve or a packing gland 18 should be provided through the walls 5 for each of the rods 16.

Figure 3 shows an enlarged view of a portion of the cell in cross-section at the slide bar 15 and the members adjacent thereto. Guide lugs or means not shown should also be provided to hold the sliding strip 15 in place. The other members shown have the same numbers and are the same as described in Figure 1.

Figure 4 shows an enlarged isometric view of a portion of the slide strip 15 and its component parts. This being one form of the assembly only, and not the only construction possible. The strip 15 has spaced slots 14' which correspond to the slots 14 in the sand-trough member 10. Web members 19 are used to attach the rod 16 to the strip 15 and may be welded in place.

To give an example of the operation and usefullness of the improvement comprising the invention, it will be assumed that a bank of tubes 1 in a chamber 2 are to be heated as part of the process step in butane dehydrogenation. The tubes 1 are filled with a suitable catalyst and have butane circulating therethrough, such that a dehydrogenation of the butane takes place at high temperature from 1000°–1100° F. Hot combustion gases are admitted to the cell through inlet duct 4 and because of baffle plate 9 and the sand-seals 11 are forced to flow through the sleeves 3 around the tubes 1. The sleeves 3 provide equal circumferential heating to and throughout the length of the tube 1. The temperature of the hot gases entering duct 4 is approximately 1400° F. and the temperature of the gases after contact with tubes 1 is approximately 1120° F. If there were no jacket provided within the cell, the outer rows of tubes 1 would be cooler than the inner tubes 1 because these outer tubes would contribute by direct radiation the larger part of the heat loss from the exterior walls of the chamber. However, with the jacket 12 provided, the flow of hot gases entering heated space 13 through slots 14, is so regulated as to maintain the jacket 12 temperature approximately equal to the temperature of sleeves 3 in the outer rows of tubes 1. Hence, since there is no temperature difference, there is no loss of heat from these sleeves 3 to the jacket 12, and it follows that all of the sleeves 3 and all the tubes 1 operate at the same temperature, with all the heat loss from the chamber exterior walls being supplied by the stream of heating gases flowing in space 13. It is desirable that the spacing of jacket 12 from the exterior walls of the chamber be as small as will permit sufficient gas to flow through space 13, at the available pressure drop from top to bottom of sleeves 3, to supply the heat loss through the exterior walls and maintain jacket 12 everywhere at approximately the same temperature as sleeves 3. If a greater spacing than this is used, then an excessive flow of hot gas must be passed through space 13 to maintain jacket 12 and sleeves 3 at approximately the same temperatures. The control of the flow of the gases to this space 13 is by means of the slide strip or strips 15, which operate to open and close or have partially open, the slots 14. The handles 16' on the rods 16 which extend through the wall, provide means outside the cell to adjust the air openings. The hot gases bypassed to this space 13, and through the tubes 3 discharge to the bottom of the cell 2 and then are withdrawn by means of duct 4'.

It is, of course, very desirable from the process point of view to have all tubes in the bank heated equally to obtain as uniform a dehydrogenation and reactivation of the products as is possible. Assume a 5" thick wall of insulating material for the cell having a conductivity of 0.13 B.t.u per square foot, per °F., per foot, per hour, also assume that the jacket 12 is spaced from the wall 5 approximately 1"; then for a commercial size unit with cell 2 being approximately 10 feet in height, it may be shown that with about 10% of the hot flue gases charged to the unit being shunted to space 13, the tubes can be maintained at substantially equal temperatures. Calculations show that with 1400° F. inlet gases, the gas leaves space 13, at the bottom, at 1250° F., with the jacket 12 at 1120° F. at this level; while the sleeves 3 are also at 1120° F., so there is no loss from them to the jacket.

The equalization of tube temperatures during the reactivation process is also important; however, the temperature conditions are lower, and the differentials in temperature do not become so great. In the reactivation process gas with controlled oxygen content is charged to the tubes 1 in order to burn off carbon deposit on the catalyst within. This process is exothermic so that the flue gases, on the outside of the tubes entering the chamber 4 and the sleeves, 3 act to carry away excess heat, being charged to the cell at about 820° F. and being withdrawn at about 900° F. For this reactivation period, conditions are not as critical as for the processing period; however, here again the jacket eliminates much of the conduction and radiation losses of the wall, and gives a more equalized condition.

The description of this invention and examples of operation have been directed to the dehydrogenation of butane. However, other processes such as hydrogenation, catalytic cracking, etc., wherein heat exchange occurs in a chamber or cell similar to that described, may well make use of the invention to obtain equalized conditions.

I claim as my invention:

1. A heat exchange apparatus comprising a chamber having side walls and end walls, a bank of tubes extending through said end walls and the chamber, a partitioning member extending across the chamber and forming an inlet compartment with one of said end walls and a heating compartment with the other of said end walls, a sleeve concentric with and spaced from each of said tubes and extending through said partitioning member, said sleeves terminating short of said end walls and being open at their opposite ends, a plate parallel with said tubes and sleeves extending from said partitioning member adjacent but spaced from one of said side walls within the heating compartment and disposed outside said tube bank and forming with the side wall a jacket communicating with the interior of the heating compartment adjacent the end thereof opposite the partitioning member, said partitioning member being apertured between said plate and the last-mentioned side wall to provide communication between said inlet compartment and said jacket, means for introducing a fluid heating medium to the inlet compartment and means for removing said medium from the heating compartment.

2. The apparatus as defined in claim 1 further characterized in that the apertured portion of said partitioning member is provided with adjustable means for controlling the flow of heating medium from the inlet compartment to said jacket.

CHARLES C. WATSON.

REFERENCES CITED

The following references are of record in the file of this patent:

UNITED STATES PATENTS

| Number | Name | Date |
|---|---|---|
| 826,773 | Engleitner | July 24, 1906 |
| 2,024,828 | Levine | Dec. 17, 1935 |

FOREIGN PATENTS

| Number | Country | Date |
|---|---|---|
| 11,180 | Leek (Australian) | Jan. 9 1928 |